United States Patent [19]

Kuepper et al.

[11] Patent Number: 4,543,142
[45] Date of Patent: Sep. 24, 1985

[54] PROCESS FOR MAKING NESTED PAPER TOWELS

[75] Inventors: Daniel H. Kuepper, Winnebago County, Wis.; Peter J. Allen, Litchfield County, Conn.

[73] Assignee: Kimberly-Clark Corporation, Neenah, Wis.

[21] Appl. No.: 600,856

[22] Filed: Apr. 16, 1984

[51] Int. Cl.⁴ .............. B31F 1/20; B32B 7/14; B32B 3/00; B29H 7/04
[52] U.S. Cl. .................. 156/209; 156/199; 156/210; 156/219; 156/291; 156/292; 428/154; 428/166; 428/172
[58] Field of Search .............. 428/198, 154, 166, 172; 156/199, 209, 210, 219, 291, 292, 582

[56] References Cited

U.S. PATENT DOCUMENTS

| | | | |
|---|---|---|---|
| 3,684,603 | 8/1972 | Iltis | 156/291 |
| 3,708,366 | 1/1973 | Donnelly | 156/291 |
| 3,867,225 | 2/1975 | Nystrand | 156/291 |
| 3,953,638 | 4/1976 | Kemp | 156/291 |
| 4,181,548 | 1/1980 | Weingarten | 156/292 |
| 4,483,728 | 11/1984 | Bauernfeind | 156/292 |

Primary Examiner—Edward Kimlin
Assistant Examiner—Merrell C. Cashion

[57] ABSTRACT

A process for making two-ply nested paper towels utilizing matched steel engraved rolls, each steel roll having male and female elements spaced apart by a neutral zone, wherein nesting and ply attachment are achieved by partially conforming each of two plies to the steel rolls, applying adhesive to the raised portions of at least one of the partially conformed plies, and partially engaging the two steel rolls such that the raised portions of one ply contact the depressions of the other ply.

6 Claims, 6 Drawing Figures

PROCESS FOR MAKING NESTED PAPER TOWELS

BACKGROUND OF THE INVENTION

In the production of paper towels and the like, it is well known to produce nested, glued towels. Nested towels consist of two embossed plies wherein the raised portions of one ply "nest" into the recessed portions of the other ply, preferably in such a manner to create trapped air pockets which increase bulk and absorbant capacity. Examples of such products are illustrated in U.S. Pat. No. 3,708,366 to Donnelly. These products are produced by embossing two paper webs in rubber/steel nips, applying adhesive to the raised embossments of one of the webs, and pressing the two webs together such that the raised embossments of the webs containing the adhesive are pressed against the recessed embossments of the other web to achieve ply attachment.

However, one disadvantage of prior methods is that they produce two-sided products, i.e. the surface contour of one side of the product is different from the surface contour of the other side of the product. This is illustrated by FIG. 2 of the above-mentioned Donnelly patent and can be undesirable from a consumer acceptance standpoint.

Another disadvantage of some prior methods is that oftentimes the two plies are engaged in a steel/steel nip using very close clearances in order to achieve ply attachment to achieve, for example, a product of the type illustrated in FIG. 3 of the abovesaid Donnelly patent. In operating in this manner, the steel embossing rolls tend to wear down due to uneven and excessive nip pressures which result from the necessity of bringing the plies into contact with each other. This problem is substantially mitigated by the use of a rubber/steel nip as shown in the abovesaid Donnelly patent, but this can give rise to adhesive strikethrough due to the pressures between the two solid surfaces.

Therefore there is a need for a method of making one-sided nested towels and the like in which embossing roll wear and adhesive strikethrough are minimized.

SUMMARY OF THE INVENTION

In general, the invention resides in a method for making multiply nested webs wherein ply attachment is achieved in a steel/steel nip by pressing a glued portion of a first web, backed by a solid surface, against a portion of a second web which is not backed by the surface of the second steel roll is instead held in tension over a recessed area of the second roll. This method eliminates or minimizes roll wear and adhesive strikethrough because there is no need for high nip pressures. In addition, a one-sided product can be obtained.

More specifically, the invention resides in a process for making a two-ply nested web, such as two-ply paper towelling, comprising: (a) partially conforming a first ply to the surface of a first steel roll having alternating raised male elements and recessed female elements separated by neutral shoulders, wherein said first ply substantially conforms to the male elements and neutral shoulders but substantially bridges the female elements; (b) partially conforming a second ply to the surface of a second steel roll having alternating raised male elements and recessed female elements separated by neutral shoulders, wherein said second ply substantially conforms to the male elements and neutral shoulders but substantially bridges the female elements; (c) applying adhesive to portions of the first ply which are in contact with the raised male elements of the first roll; and (d) partially engaging the first and second rolls wherein the adhesive-containing portions of the first ply press against the bridged portions of the second ply, thereby causing ply attachment and producing a nested web.

DETAILED DESCRIPTION OF THE DRAWING

Figure 1:
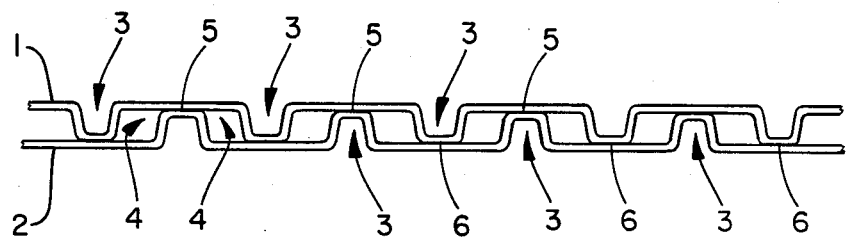
FIG. 1 is a cross-section of a one-sided web made in accordance with this invention, illustrating a nested structure.

Directing attention to FIG. 1, the invention will be described in greater detail. FIG. 1 shows a cross-section of a one-sided, two-ply web made in accordance with this invention. More particularly, shown is a first ply 1 and a second ply 2, each of which have regularly spaced-apart indentations 3 which have been nested to form trapped air pockets 4. Note that both outer surfaces of the two-ply web are identical (one-sided). The two plies are adhesively attached together at contact areas 5. If desired, ply attachment could also occur at the corresponding contact areas 6 along the opposite side of the two-ply web, but such additional adhesive is unnecessary for purposes of attachment and increases adhesive cost. In addition, stiffness of the final two-ply web would probably be increased. The spacing between indentations is a matter of optimization of the product and can vary depending on the feeling of bulk desired in the finished product. Generally, a close spacing of the indentations is preferred since it promotes a bulkier feeling sheet. As an example, indentations having a length of about 0.07 inch can be spaced apart by about 0.15 inch to give a good feeling sheet. Such indentations can have a depth of about 0.03 inches.

Preferably only two plies are used to form the product, although a third ply can be present in the center. In such a situation, however, adhesive application at contact areas 5 and 6 of both the first and second webs would be necessary to link all three plies together by adhering the first ply to the center ply and the center ply to the second ply.

The composition of the plies is preferably cellulosic papermaking fibers, with paper towelling being the most likely product of this invention. However, other types of wipes and the like can also be produced in this manner, and the individual plies can contain synthetic as well as natural fibers. Basis weights can range from 17 to about 26 grams per square meter, preferably about 20 grams per square meter, depending on the composition of each ply. Methods for production of the individual plies are well known in the papermaking arts.

Figure 2:
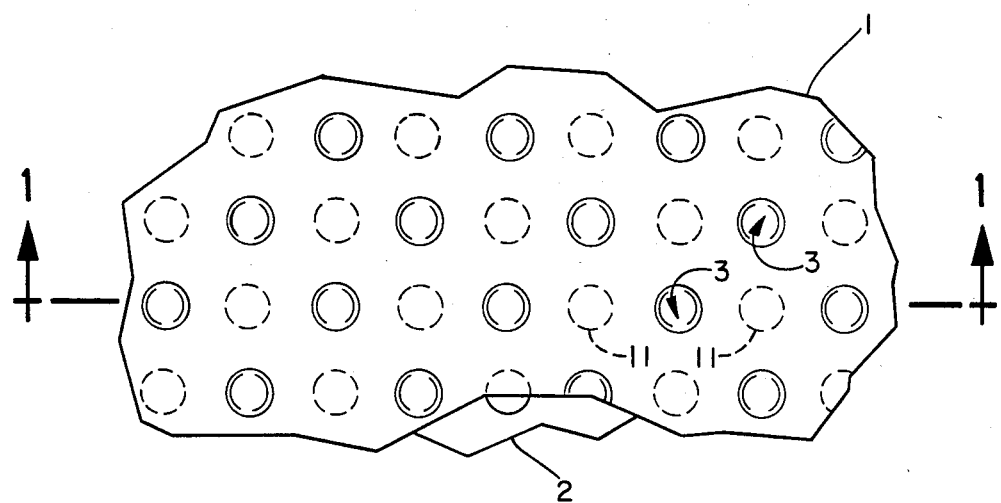
FIG. 2 is a plan view of the web of FIG. 1, illustrating an example of a suitable embossing design using regularly-spaced, circular embossments.

FIG. 2 is a plan view of a two-ply web made by the process of this invention having the cross-section of FIG. 1. This view illustrates an embossing design imparting circular indentations. The shape of the indentations can vary as desired. Ovals, for example, have been found to be particularly desirable for aesthetic reasons. Shown is the first ply 1 with indentations 3. The dotted circles 11 represent corresponding indentations in the second ply on the opposite side of the two-ply web, which correspond to the contact areas 6 of FIG. 1.

Figure 3:
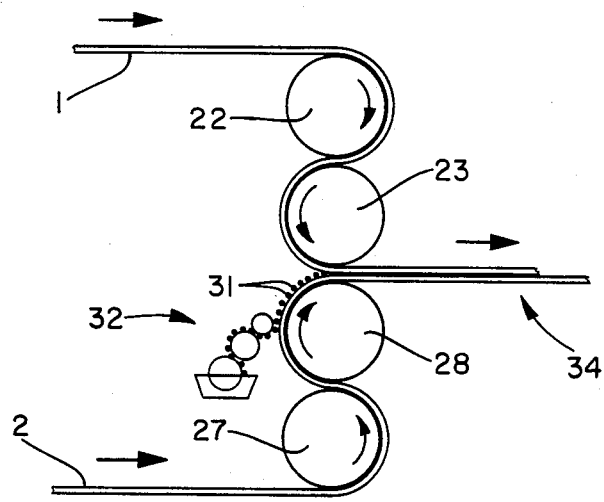
FIG. 3 is a schematic flow diagram of a process in accordance with this invention, illustrating a preferred arrangement of the steel and rubber rolls.

FIG. 3 is a schematic view of a preferred process of this invention. Shown is a first ply 1 being continuously directed into a nip formed between rubber covered roll 22 and a matched steel engraved roll 23. The steel roll 23 has an engraved surface consisting of male and female elements as hereinafter described in FIG. 4. The pressure exerted by the deformable rubber surface of the roll forces the ply to partially conform to the contour of the steel roll surface. A rubber covered roll having a durometer hardness of about 40 has been found suitable. Similarly, a second ply 2 is also continuously directed into a nip found between rubber covered roll 27 and matched steel engraved roll 28, thereby also partially conforming to the contour of the engraved steel roll. The patterns of the matched steel engraved rolls 23 and 28 are identical and the two rolls are indexed to mesh perfectly, but for the fact that they are sufficiently spaced apart to only partially engage as will hereinafter be described with reference to FIG. 6. Prior to entering the ply attachment nip formed between the matched steel engraved rolls, adhesive 31 is applied to the raised portions of the second ply with a roll applicator 32. The roll applicator actually consists of several rolls in series which transfer adhesive from a reservoir onto the second ply. These devices are well known in the art. As the first and second plies enter the ply attachment nip, the raised portions of each ply nest with the recessed portions of the other ply. As a result, the adhesive contacts the other ply and attachment occurs. The product web 34 is a two-ply, one-sided, nested, glued web.

Figure 4:
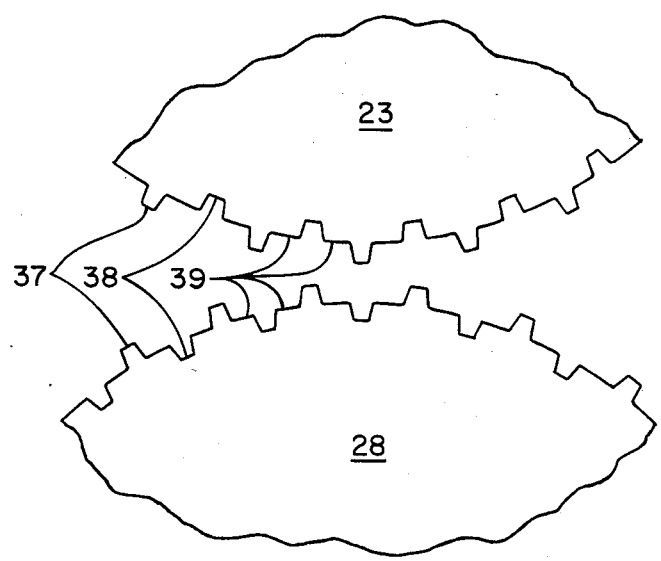
FIG. 4 is a cross-sectional segment of the surfaces of a pair of matched steel rolls useful in the process of this invention.

FIG. 4 is a cross-sectional view representing a portion of the surfaces of matched steel engraved rolls 23 and 28 referred to in FIG. 3. Shown are the male elements 37, the female elements 38, and the neutral shoulders 39 which separate the male and female elements. As previously mentioned, rolls 23 and 28 are matched steel engraved to mesh together perfectly with proper indexing. However, for purposes of this invention, the rolls are sufficiently spaced apart in operation such that only partial engagement occurs. The spacing and size of the male and female elements is a matter of design choice.

Figure 5:
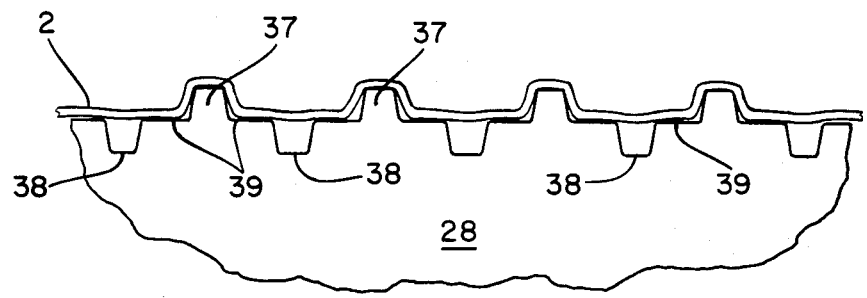
FIG. 5 is a cross-sectional segment of the surface of one of the rolls of FIG. 4, illustrating partial conformation of a web to the surface.

FIG. 5 illustrates the configuration of a ply which has been partially conformed to the surface of a roll described in FIG. 4 as a result of passing through a rubber/steel nip. Specifically shown, for example, is the second ply 2 substantially conforming to the male elements 37 and neutral shoulders 39, but substantially bridging the opening of female elements 38. Depending on the width of the female element, resiliency of the rubber surface of the rubber covered roll used to press the ply against the steel roll, and the basis weight of the ply, there may be some tendency for the web to partially conform to the female element, but the deflection is preferably immeasurably small and unsufficient to leave a permanent impression on the sheet. To maintain as much operating flexibility as possible, the shape of the male and female elements is tapered to avoid excessive shearing of the web when partial engagement exceeds 50 percent, which is the point at which the male element of one roll reaches the neutral shoulders of the other roll. Preferably the partial engagement is from about 50 to about 55 percent.

Figure 6:
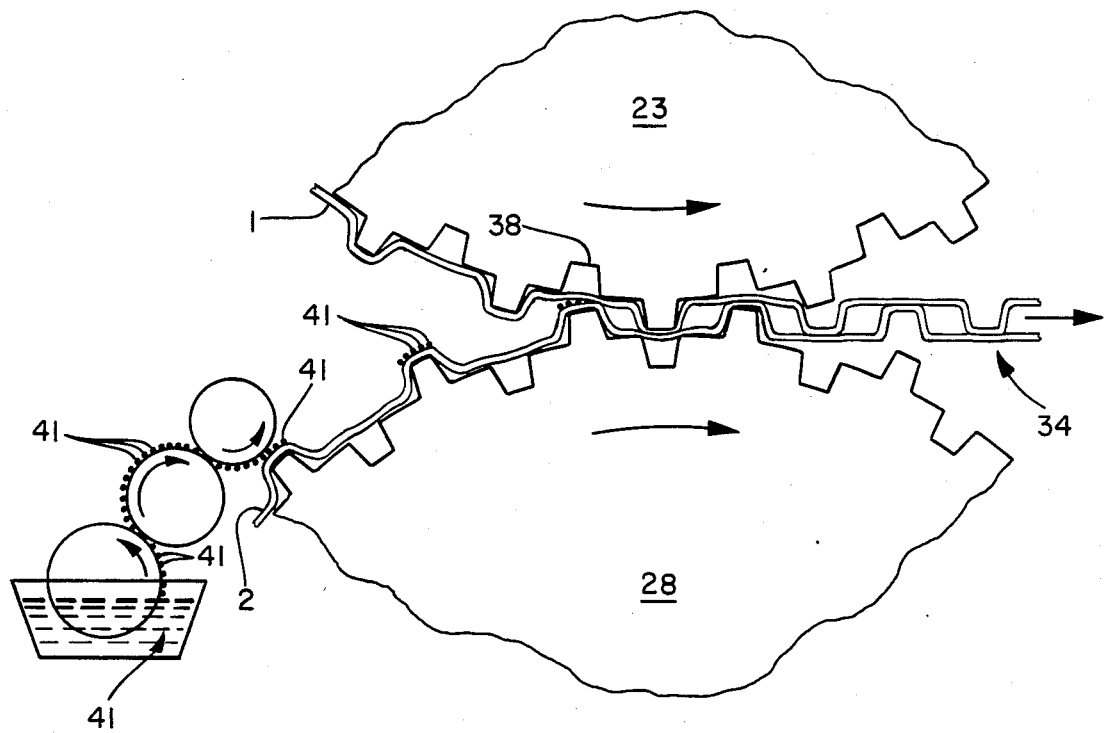
FIG. 6 is a cross-sectional view of the nip between the two matched steel rolls of FIG. 3, illustrating ply attachment and formation of a one-sided, nested, glued web in accordance with this invention.

FIG. 6 illustrates in greater detail the final step in producing a two-ply web in accordance with this invention as previously described with reference to FIG. 3, wherein the two plies are nested and attached in the ply attachment nip formed between the two matched steel rolls. Shown are the two rolls 23 and 28 which are sufficiently spaced apart to cause only partial engagement, but close enough to cause contact between the first and second plies at the points where adhesive has been applied to the second ply. The second ply 2 has adhesive 41 on its raised portions corresponding to the male elements of roll 28, the adhesive being applied as previously illustrated in FIG. 3. The adhesive is shown for illustration purposes or dots, but in fact is a thin coating. The adhesives used can be any adhesives useful for ply attachment and are well known in the papermaking art, such as polyvinyl alcohol, ethylene/vinyl acetate copolymer, polyvinyl acetate, acrylic copolymers, styrene/butadiene copolymers, etc. An add-on rate of about 0.8 weight percent has been found suitable.

As the two plies approach each other in the nip, the adhesive-containing raised portions of the second ply are brought into contact with the portion of the first ply 1 bridging the opening of the female element 38 of the other roll 23. Because the bridging portion of the first web is in tension, being stretched across the female opening, very little pressure is necessary to accomplish ply attachment. On the other hand, since the first web is not backed by a solid surface at the point of attachment, roll wear and adhesive strike-through are minimized. As the two-ply product 34 leaves the nip, it has a cross-section as shown in FIG. 1.

It will be appreciated that the foregoing description and specific examples, shown for purposes of illustration, are not to be construed as limiting the scope of this invention, as defined by the following claims.

We claim:

1. A process for producing a two-ply nested paper towel comprising:
   (a) partially conforming a first ply to the surface of a first roll having alternating raised male elements and recessed female elements separated by neutral shoulders, wherein said first ply substantially conforms to the male elements and neutral shoulders but substantially bridges the female elements;
   (b) partially conforming a second ply to the surface of a second steel roll having alternating raised male elements and recessed female elements separated by neutral shoulders, wherein said second ply substantially conforms to the male elements and neutral shoulders but substantially bridges the female elements;
   (c) applying adhesive to portions of the first ply which are in contact with the raised male elements of the first roll; and
   (d) partially engaging the first and second rolls wherein the adhesive-containing portions of the first ply press against the bridged portions of the second ply, thereby causing ply attachment and producing a nested paper towel.

2. The process of claim 1 wherein said first and second rolls are matched steel rolls.

3. The process of claim 2 wherein the first and second webs are partially conformed to the surfaces of the first and second steel rolls, respectively, by compressing said webs in a nip between a rubber roll and the respective steel roll.

4. The process of claim 1 wherein the first and second rolls are engaged from about 50 percent to about 55 percent.

5. The process of claim 1 wherein adhesive is applied to the first and second plies.

6. A process for producing a two-ply nested paper towel comprising:

(a) partially conforming a first ply of papermaking fibers having a basis weight of about 20 grams per square meter to the surface of a first matched steel engraved roll having alternating raised male elements and recessed female elements separated by neutral shoulders, wherein said first ply substantially conforms to the male elements and neutral shoulders but substantially bridges the female elements;

(b) partially conforming a second ply of papermaking fibers having a basis weight of about 20 grams per square meter to the surface of a second matched steel engraved roll having alternating raised male elements and recessed female elements separated by neutral shoulders, wherein said second ply substantially conforms to the male elements and neutral shoulders but substantially bridges the female elements;

(c) applying adhesive to portions of the first ply which are in contact with the raised male elements of the first roll; and (d) attaching the first ply to the second ply in a nip between said first and second steel rolls are about 50 percent engaged and wherein the adhesive-containing portions of the first ply are pressed against the bridged portions of the second ply.

* * * * *